United States Patent
Wu et al.

(10) Patent No.: US 6,534,938 B1
(45) Date of Patent: Mar. 18, 2003

(54) METHOD AND APPARATUS FOR DRIVING A SENSORLESS BLDC MOTOR AT PWM OPERATION MODE

(75) Inventors: Zhigan Wu, Shanghai (CN); Jin Wang, Shanghai (CN); Jianping Ying, Shanghai (CN)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 09/964,757

(22) Filed: Sep. 28, 2001

(51) Int. Cl.[7] .................................................. H02P 5/06
(52) U.S. Cl. ........................ 318/254; 318/138; 318/439
(58) Field of Search ................................ 318/254, 138, 318/439

(56) References Cited

U.S. PATENT DOCUMENTS

| | | | | |
|---|---|---|---|---|
| 5,367,234 A | * | 11/1994 | DiTucci ...................... | 318/138 |
| 5,517,095 A | * | 5/1996 | Carobolante et al. ....... | 318/138 |
| 5,731,670 A | * | 3/1998 | Galbiati et al. ............. | 318/254 |
| 5,804,939 A | * | 9/1998 | Yamai et al. ................ | 318/138 |
| 5,872,442 A | * | 2/1999 | Gotou ......................... | 318/138 |
| 6,081,087 A | * | 6/2000 | Iijima et al. ................. | 318/439 |

FOREIGN PATENT DOCUMENTS

JP            407322679 A   *   12/1995           H02P/6/16

* cited by examiner

Primary Examiner—Rita Leykin
(74) Attorney, Agent, or Firm—Birch, Stewart, Kolasch & Birch, LLP

(57) ABSTRACT

A control system operates with a PWM speed regulation of a sensorless BLDC motor with a plurality of windings. A hybrid method is present in the invention utilizing BEMF induced in stator windings to indicate the commutation instant and a falling edge detection method to override PWM chopping and commutation noises. The present invention achieves reliable sensorless rotor position detection with relative concise and low cost circuit as well as little software expense. The control device of the present invention includes a comparator for generating the BEMF zero crossing points (ZCP), and means for deriving rotor position information by detecting the falling edge (or rising edge for low-side chopping case) of the generated ZCPs.

12 Claims, 14 Drawing Sheets

| Falling edge detected phase | High side commutation | | Low side commutation | |
| --- | --- | --- | --- | --- |
| A | Qb+ | Qc+ | Qa− | Qb− |
| B | Qc+ | Qa+ | Qb− | Qc− |
| C | Qa+ | Qb+ | Qc− | Qa− |

FIG. 10

| Falling edge detected phase | State of position signals |
|---|---|
| A | 110 → 010 |
| B | 011 → 001 |
| C | 101 → 100 |

FIG. 12

METHOD AND APPARATUS FOR DRIVING A SENSORLESS BLDC MOTOR AT PWM OPERATION MODE

FIELD OF THE INVENTION

The present invention relates in general to the control of a sensorless and brushless DC (BLDC) motor. More particularly, the present invention relates to a sensorless BLDC motor operating at PWM (Pulse Width Module) mode.

BACKGROUND OF THE INVENTION

Generally, BLDC motors use semiconductor drive circuits in DC motors so that commutators and brushes are not needed. Namely, BLDC motors are able to control current using semiconductor switches comprised of inverters, and include an armature with a plurality of windings performing a stator function, a permanent magnet performing a rotor function, and a position detecting portion performing a brush and commutator function.

In order for the motor to function correctly, the flux existing in the stator must always be about 90 electrical degrees in advance of the rotor to continually pull the rotor forward. However, the rotor movement and the flux rotation should never be allowed to get out of synchronization, as the rotor may stop turning, or in any case will become very inefficient. Therefore, to obtain an average electromagnetic torque as high as possible and to optimize the efficiency of the motor, the switching of the windings from one step to another, namely, "electronically commutation", must be controlled in accordance with the actual position of the rotor.

Generally speaking, the BLDC motor above is controlled by detecting the position of the rotor, then applying a current to a stator according to this position. A position detection part is provided to detect the position of the rotor using either a Hall method utilizing a Hall element, an optical method, a high frequency induction method, a high frequency oscillation method, a reed switch method, or a magnetoresistive element method to detect the position of the rotor. However, when using a BLDC motor in a compressor, high temperatures and high pressures caused by coolant compression can reduce the reliability of a sensor and wiring of the position detecting sensor inside the BLDC motor complicates the manufacturing process and increases the size of the motor.

Solutions exist whereby a "self-commutating" or "self-controlled" mode of operation of the motor is used. By monitoring the BEMF generated in the windings, and more particularly, the zero crossing points of such back electromotive force (BEMF), the position of the rotor at a particular time is determined. BEMF is the voltage induced on a winding by a changing magnetic field present in the motor. The movement of a rotor pole contributes to the changes in the magnetic field (due to the magnetic field in the rotor), and therefore the BEMF provides some information about the instantaneous position of the rotor. A change in the sign of the BEMP occurs when a rotor pole passes through the center of the floating armature coil. By detecting zero-crossings in the BEMF, adequate information about rotor positions is provided.

The concise topology of the inverter fed 3-phase star-shaped BLDCM is shown in FIG. 1. In such a BLDC motor operated in the self-controlled mode, commutations occur at the instants when two of the three stator phases have equal BEMF to obtain the optimal efficiency of the motor. These commutation instants are shown clearly in FIG. 2 as t0, t1, t2, t3, t4 and t5. It is seen that such commutation events occur at 30° delay from the corresponding zero-crossing points of BEMF waveforms. Therefore, commutation instants are generated from delaying the detected BEMF zero-crossing points for about a value of (30°+k*60°), wherein k=0, 1, 2 . . .

The BEMF is a terminal voltage of a winding when the winding is not electrically driven by the external driving circuit (as the so-called floating, high impedance or tri-state mode). By differentially monitoring the voltage across the floating phase, the point at which the voltage is zero, or "zero crossing" is established. With this information, commutation (switch to the next winding phase) of a specific angle, normally 30 or 90 electrical degrees after the zero crossing is performed using a timer (either analog or digital).

There is inevitably a large voltage transition during the commutation due to a flyback current of the motor windings. An example is the waveform of the terminal voltage of phase A according to an analytical equivalent circuit of a symmetric VLCD motor, as shown in FIG. 3. At the beginning of period t0–t1 when Qa– is turned off and phase A is in a floating state. However, due to the presence of inductive element, ia still continues to flow through Da+, which is the so-called flyback current. Before ia decreased to zero, there's a short interval when all three phases are conducting current, and Va equals to Udc. Such a short interval is called commutation interval and results in a flyback pulse on terminal voltage. These flyback pulses also make transitions through zero and could cause erroneous indications of a zero crossing.

Furthermore, when the inverter is operating in PWM mode, another problem will yet arise. For mains powered motors, such as those commonly used to power domestic appliances, the DC power supply Vs is directly derived from the AC mains and may thus have a value of around +300V relative to the ground voltage for a 220V mains AC supply. The voltage actually supplied to each of the windings of the motor is controlled by pulse width modulation (PWM) of the DC supply voltage. In PWM the duration of each pulse is adjusted to provide the desired average voltage and current level. Meanwhile, in motor control systems generally, the control logic gets one or more data inputs to determine the commanded velocity of the motor, and accordingly controls PWM duty of the inverter to apply the correct average drive voltage to the motor so as to regulating the motor velocity as desired.

Various PWM schemes are possible, depending on which of the six switches in the inverter is in chopping mode. There are also two ways of handling the PWM switching: 4-quadrant chopping and 2-quadrant chopping. In 2-quadrant chopping, only one of the two simultaneous-conducting switches is in PWM chopping. Taking the 2-quadrant pattern with high-side or low-side chopping pattern for example. In the high-side (low-side) chopping mode, the low (high) side switch is kept ON during the 120 degree interval and the high (low) side switches switch according to the pulsed signal. In the 4-quadrant chopping technique both of two switches corresponding to the two phases in ON mode are driven by the same signal: the two switches are turned-on and turned-off at the same time.

These PWM chopping make multiple transitions through zero and could cause erroneous indications of pseudo zero crossings. The detailed waveform of terminal voltage of the inverter in high-side chopping mode, including the commutation interval and PWM chopping effect, is shown in FIG.

5. It can be seen that additional method should be applied to filter out the extra pseudo zero crossings.

Several methods have therefore been proposed to obtain more accurate zero-crossing detection:

1) Converting the BEMF to linear driving before the time of expected detection; and
2) Sampling the BEMF synchronously with the PWM switching.

Method 1 of converting the BEMF to linear driving before the time of expected detection has the drawback that the linear loop will have a long settling time and also an extra current ripple. Method 2 of sampling the BEMF synchronously with the PWM switching has the drawback of jitter in detection and complicated hardware switches and/or software tasks are demanded.

There are many cases that PWM chopping frequency is not high enough to meet the fundamental frequency of stator current fed into the BLDC motor, which lie in BLDC motor systems of high power rate such as power domestic appliances like air conditioner compressor. Wherein the PWM chopping frequency commonly ranges from 3 kHz to 10 kHz, while the armature current is of a fundamental frequency range up to 200 Hz and of a commutating frequency up to 1.2 khz.

In such situations, method 1 mentioned above is not suitable because of extremely large current ripple. Once method 2 is adopted, unless interpolation of the sampled BEMF values is applied, false detection of BEMF ZCP will be generated because the zero crossing events may occur during PWM off periods. The error between the false detection and the correction is at most equals to an off period of PWM. Due to the proximity of PWM frequency and the commutation frequency, such an error is not tolerable. While the necessity of interpolation will further complicate the controller apparatus, method 2 unlikely a probable solution.

SUMMARY OF THE INVENTION

It is an object of the invention to provide a control system, which operates conveniently with a PWM speed regulation of a sensorless BLDC motor with a plurality of windings. A hybrid method is present in the invention, which achieves reliable sensorless rotor position detection with relative concise and low cost circuit as well as little software expense.

In the provided method, BEMF induced in stator windings is utilized to indicate the commutation instant. This is done by phase-shifting the zero crossing point of BEMF 90 electric degree with a filter section and software compensation. Meanwhile, the falling edge detection method is applied to override PWM chopping and commutation noise.

According to principles of the present invention, a control apparatus is provided for a multiple-phase BLDC motor in which one phase is set at high impedance for measuring the back electromotive-force of the motor while one other phase is supplied by PWM signal. The control device includes a comparator for generating the BEMF zero crossing points (ZCP), and means for deriving rotor position information by detecting the falling edge (or rising edge for low-side chopping case) of the generated ZCPs.

BRIEF DESCRIPTION OF THE DRAWINGS

FIG. 10 shows logical relations between commutation and falling edge detection.;

FIG. 12 is a table shows relations between falling edge and state of position signals;

DETAILED DESCRIPTION OF THE PREFERRED EMBODIMENTS

Figure 1:
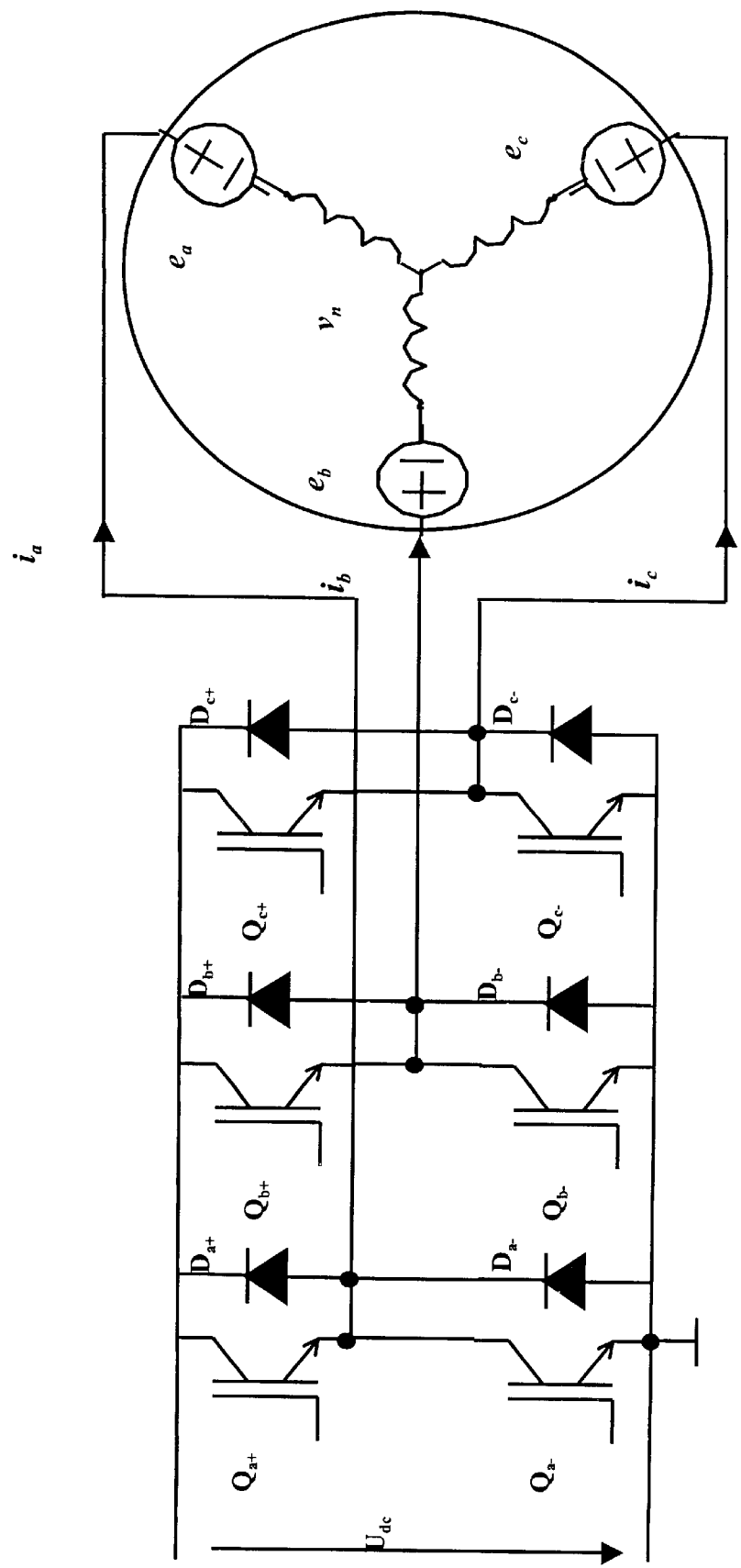
FIG. 1 shows concise topology of BLDCM drive.
Figure 2:
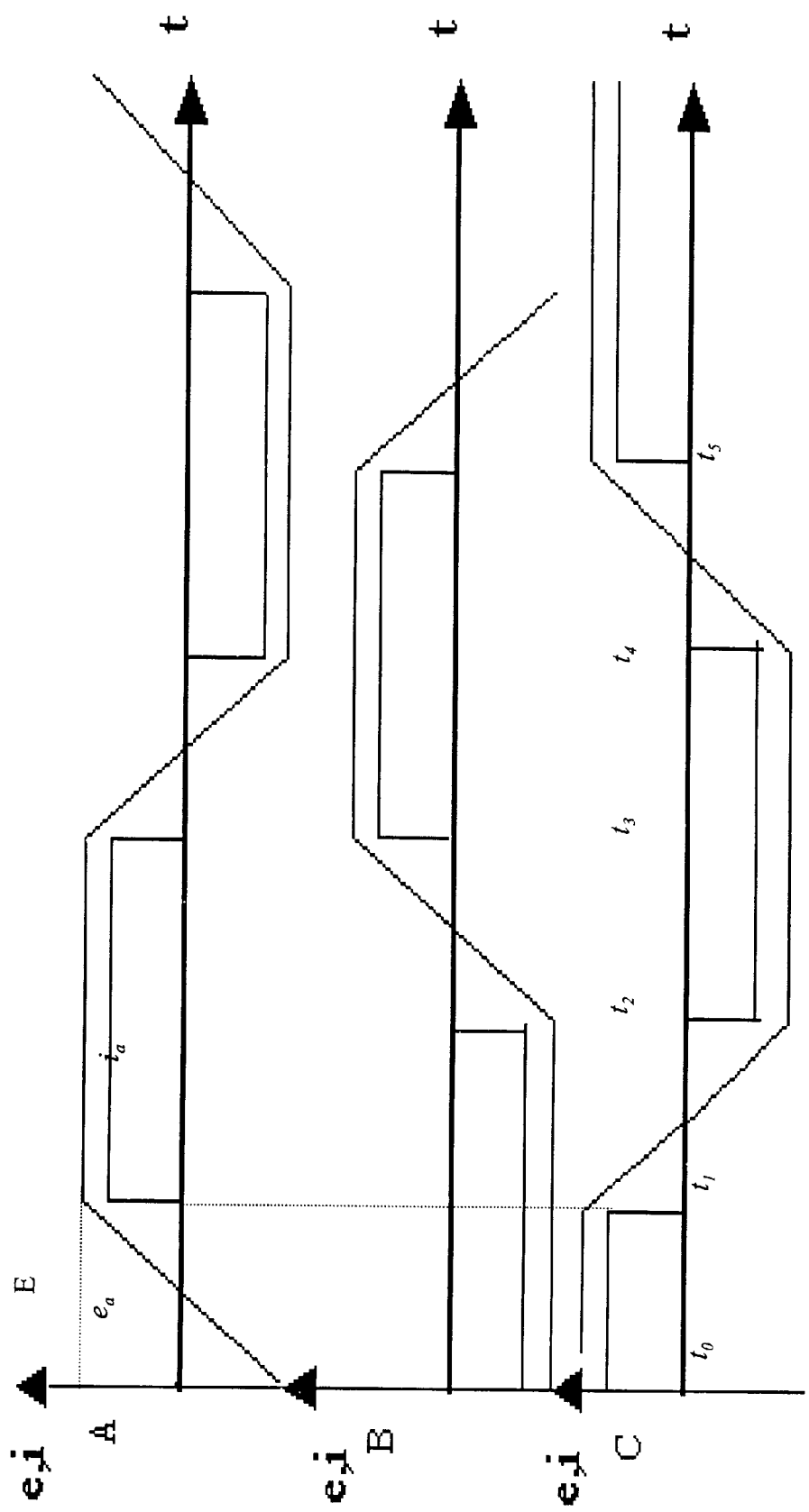
FIG. 2 shows relation between BEMF and commutation instants.
Figure 3:
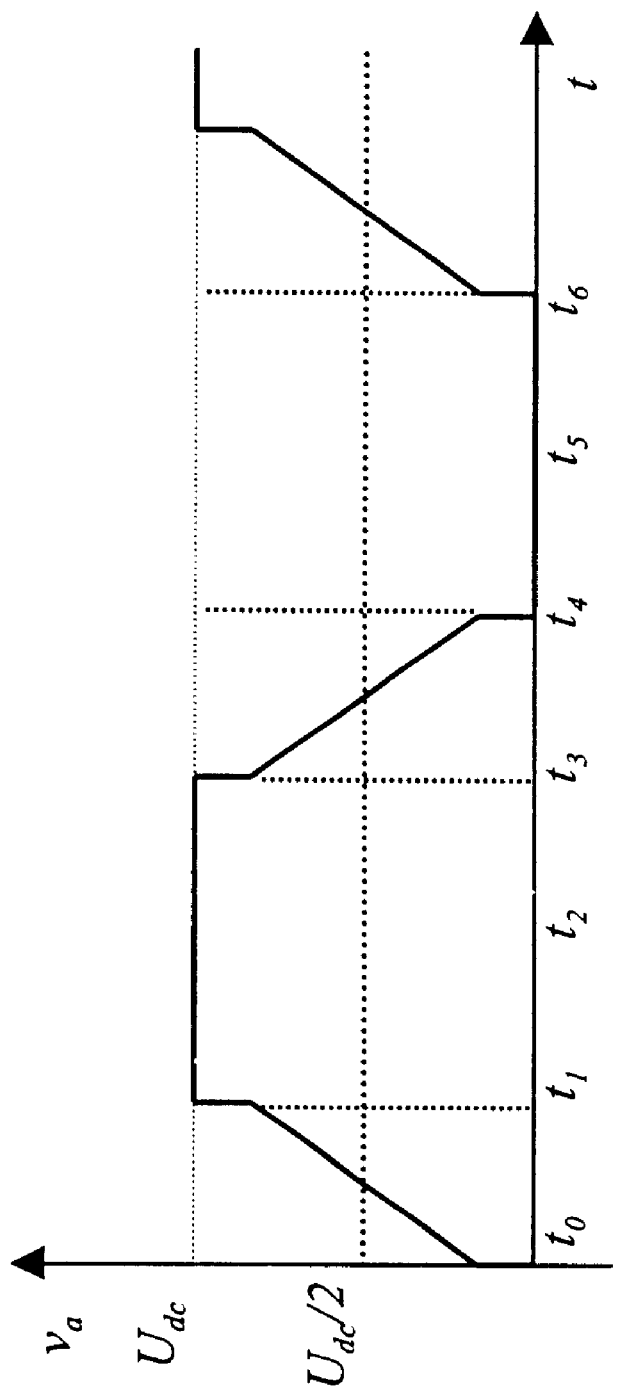
FIG. 3 shows terminal voltage of phase A.
Figure 4:
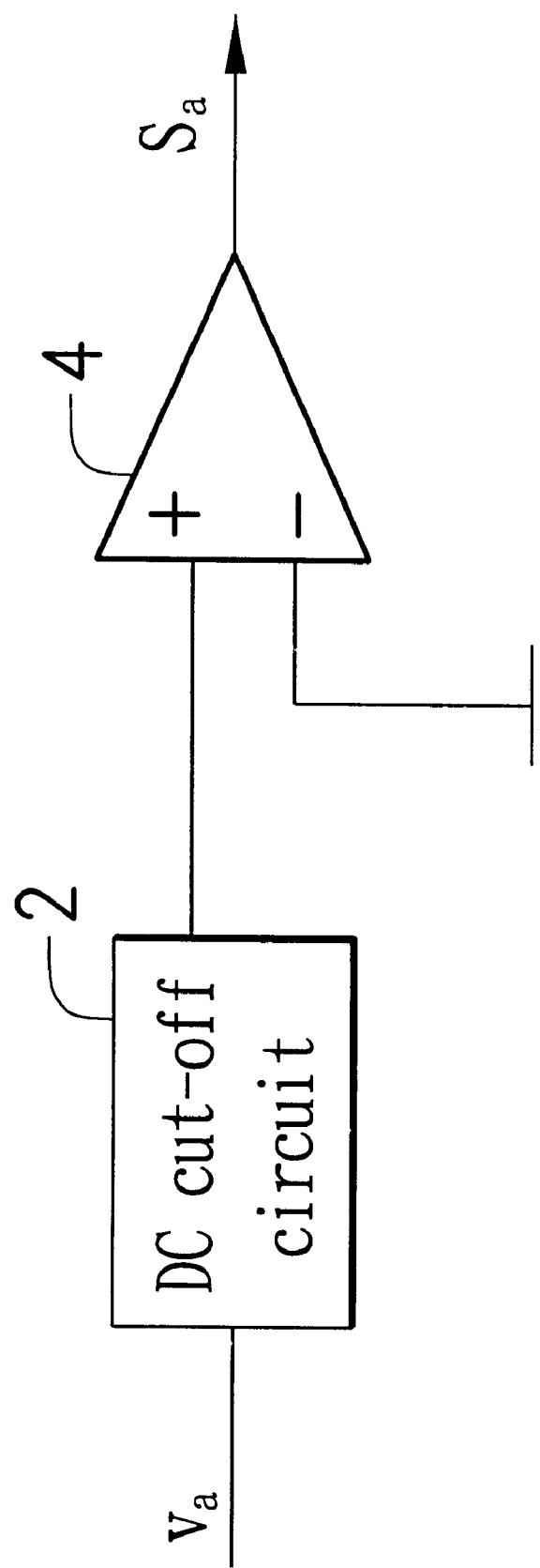
FIG. 4 shows a BEMF detecting circuit of a phase of a BLDC motor.
Figure 5:
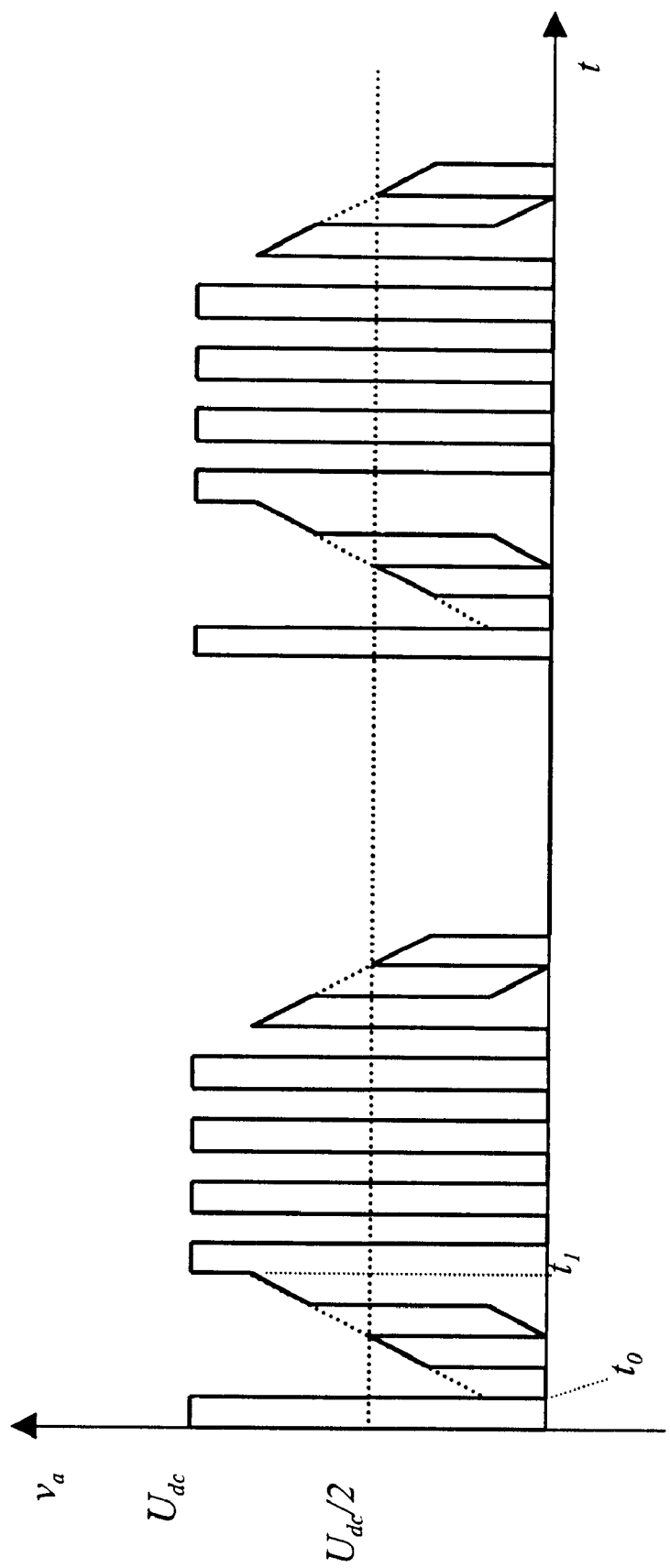
FIG. 5 shows terminal voltage of phase A under PWM chopping.

Based on the analytical equivalent circuit of the inverter fed 3-phase BLDC motor in FIG. 1, the terminal voltage of phase A has a waveform as shown in FIG. 3 (phase B and phase C are of the same one with sequential 120 degrees phase shift). During intervals of t0–t1 and t3–t4, phase A is in floating state, so that terminal voltage of phase A equals to BEMF in phase A, i.e., $e_a$, superimposed on center voltage of 3 phase windings, Vn, which equals to Udc/2 in such a situation. During the interval of t1–t3, Qa+ is ON and the winding of phase A is connected to power supply, so that the terminal voltage of phase A equals to Udc. During the interval of t4–t6, Qa− is ON and the winding of phase A is connected to ground of power supply, so that the terminal voltage of phase A equals to 0. It is evident that the DC component of Va equals to Udc/2. FIG. 4 is a BEMF detecting circuit of a single phase of a BLDC motor. Referring to FIG. 4, the DC component is removed using a DC cut-off circuit 2 and the zero crossing of $e_a$, is obtained by a comparator 4 to compare the AC component of a terminal voltage Va to zero.

Figure 6:
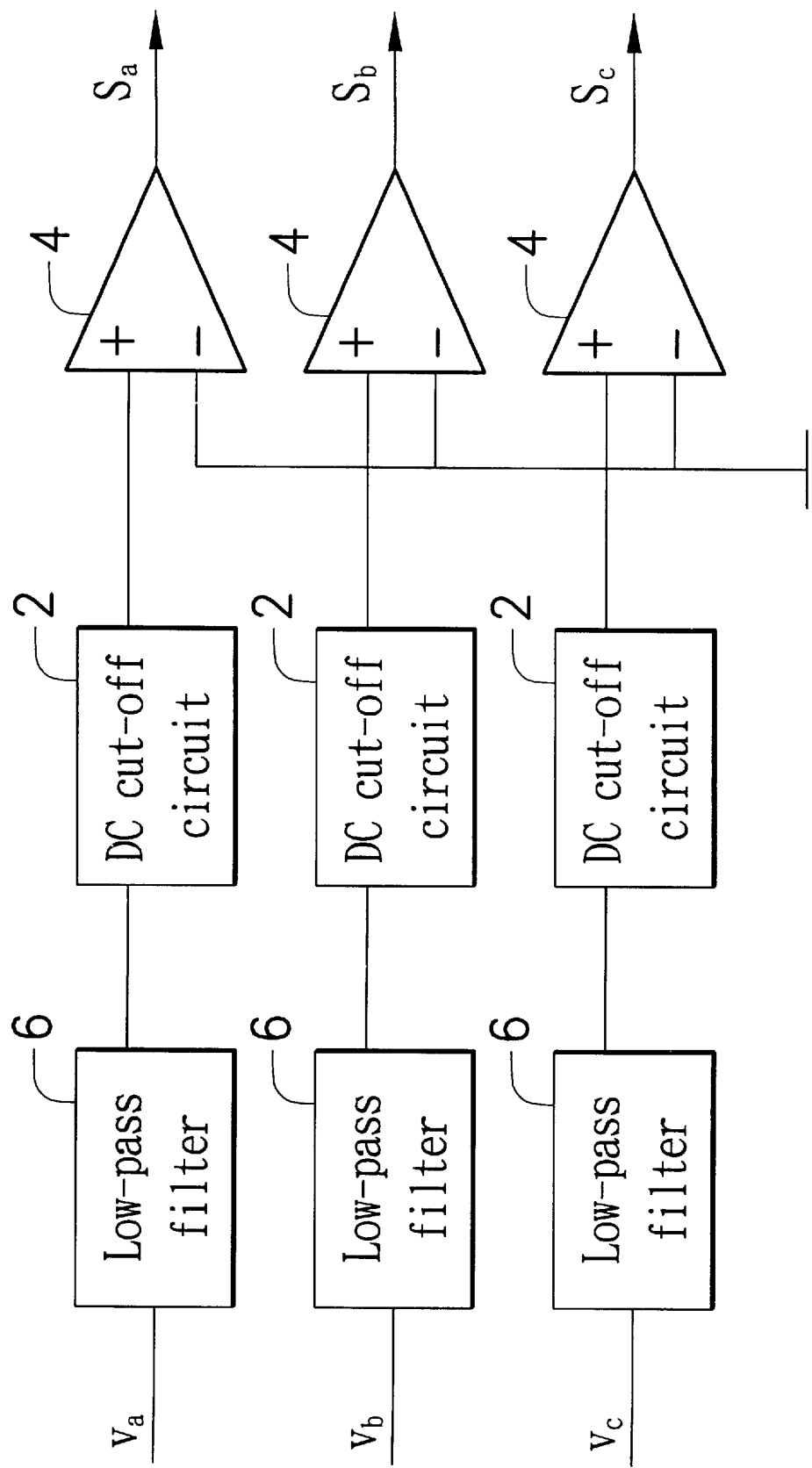
FIG. 6 shows block diagram of a BEMF detecting circuit of a three-phase BLDC motor.

A BEMF detecting circuit of a 3-phase BLDC motor is shown in FIG. 6 to detect the BEMF zero crossing events. Referring to FIG. 6, the detecting circuit comprises a plurality of simple low-pass filters 6, and the DC cut-off circuits 2 and the comparators 4 as shown in FIG. 4. The low-pass filter is aimed to attenuate PWM chopping and commutation interval interferences. The DC cut-off circuit is dedicated to remove the DC component in the terminal voltages. And $S_a$, $S_b$ and $S_c$ is the output rotor position signal of phase A, phase B and phase C, respectively. Regarding to the insignificant error between the BEMF zero-crossing reference $D*U_d/2$ and the DC component in the terminal voltages, produced by commutation interval and PWM clamp, it may be minimized by means of experimental adjusting.

Figure 7:
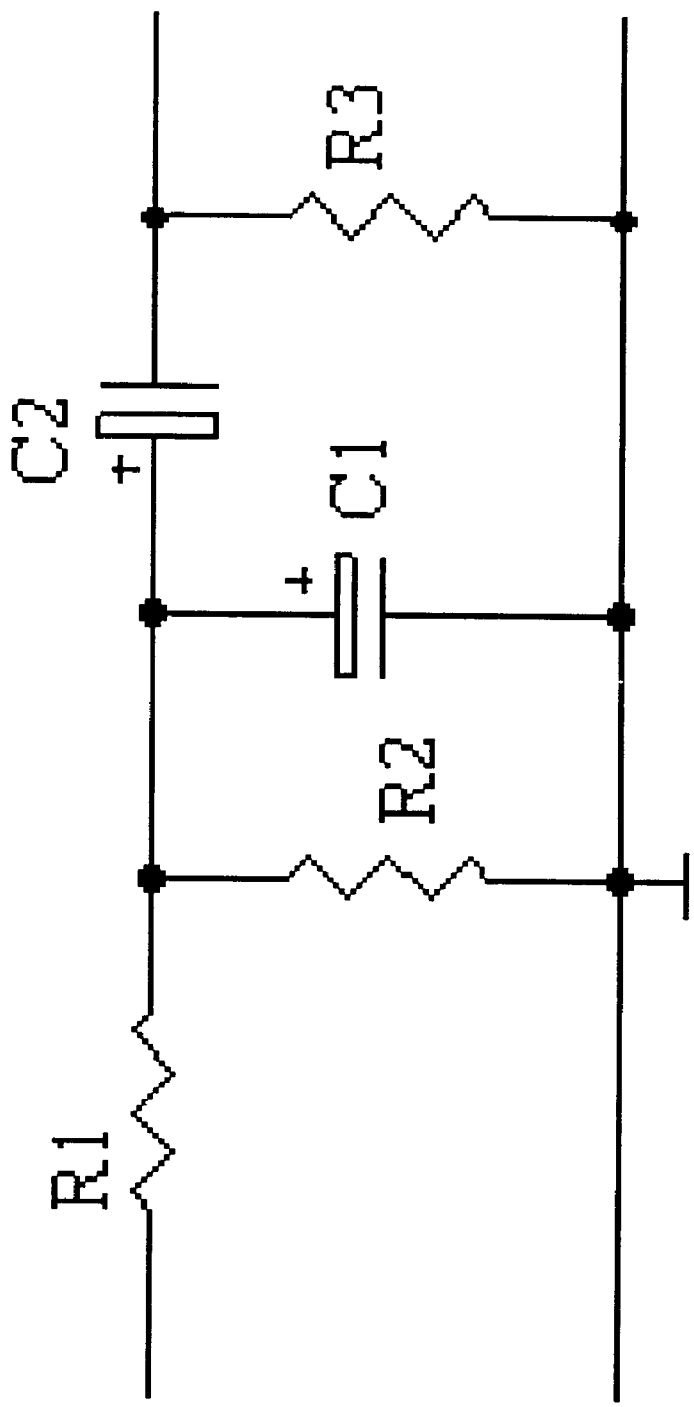
FIG. 7 shows simple circuit designed for one phase of the filters.
Figure 8:
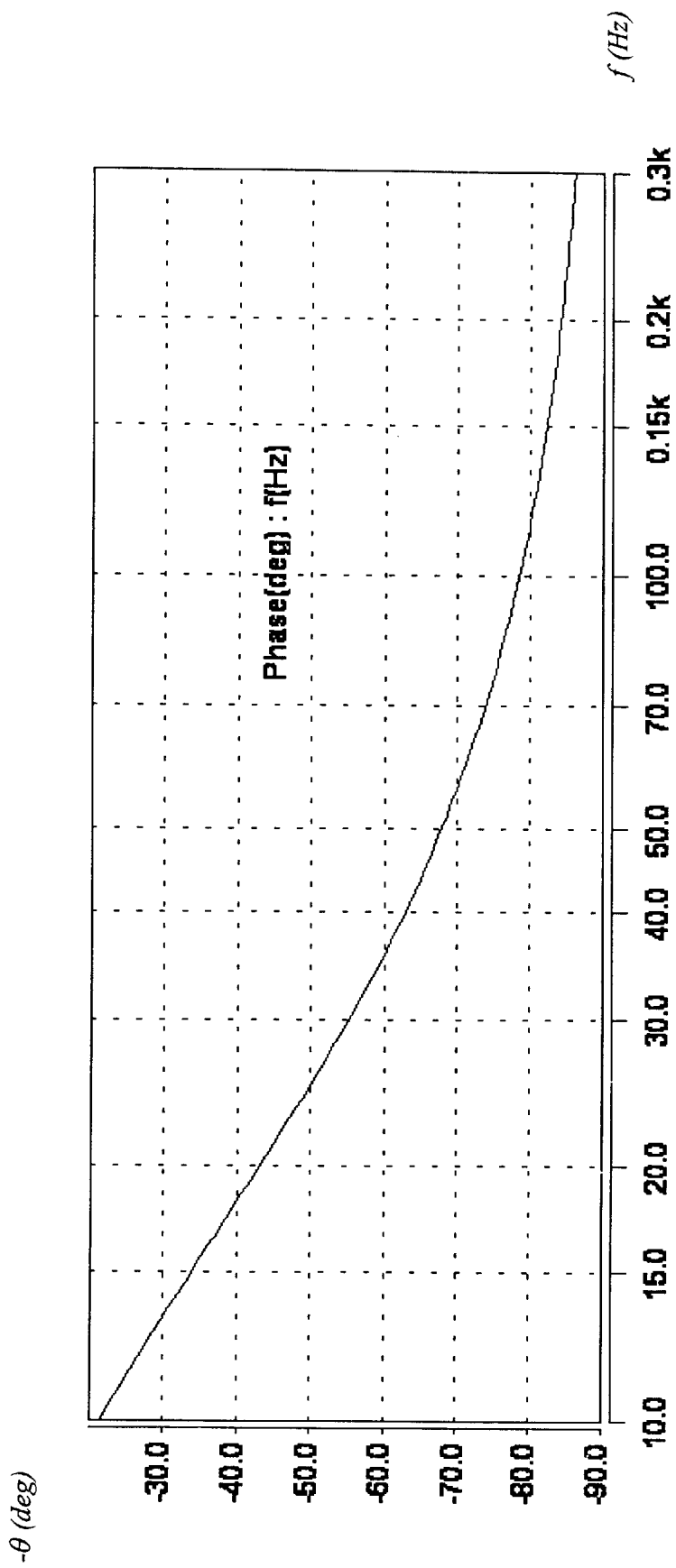
FIG. 8 shows the phase-frequency characteristic of circuit in FIG. 7.

The filters in FIG. 6 is be implemented as the circuit shown in FIG. 7. This circuit is designed for a PWM frequency of 5 kHz, and a stator current frequency range of 15~210 Hz. Wherein the resistor network constituted by R1 and R2 is aimed to divide the high rate terminal voltage so that the capacitors C1 and C2 of low voltage rate are suitable to be implemented. The phase-frequency characteristic of the circuit in FIG. 7 is shown in FIG. 8. It shows that the phase shift caused by the filter section varies from about 30° to nearly 90° in the whole operating frequency range of the BLDC motor at normal self-commutated mode.

As demonstrated previously, in order to obtain commutation instant, it is necessary to delay for 30°+k*60° (k=0, 1, 2 . . .) after BEMF zero crossing point. When k=1 is selected, a phase shift of 90° is always desired. Consequently, assuming that the BLDCM is running with a stator current frequency of f and the actual phase shift produced by filters in is, an additional phase-shifting compensation of 90°− should be introduced.

Figure 9:
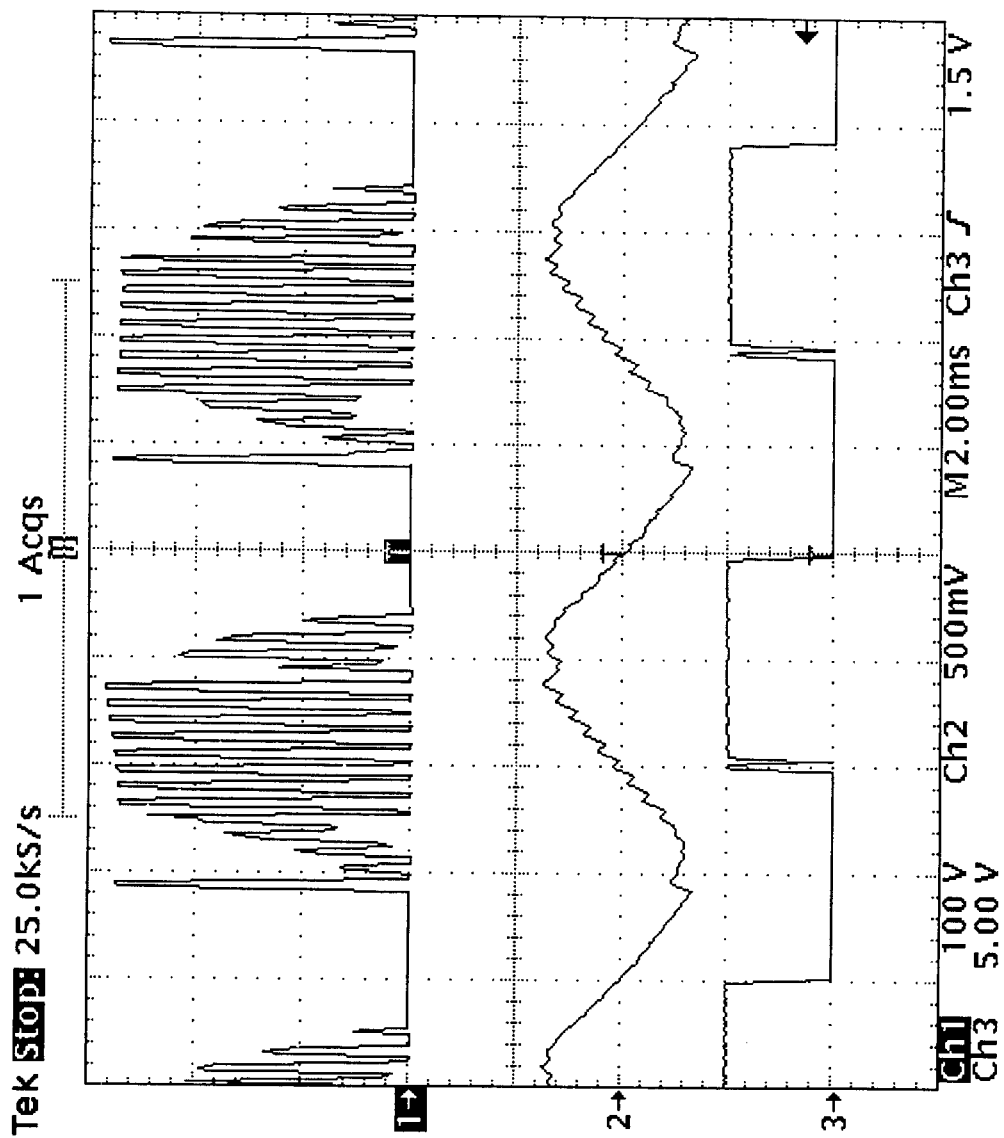
FIG. 9 shows waveforms of BEMF zero-crossing detection circuit.

The BEMF zero crossing detection effect of the circuit in FIG. 6 and FIG. 7 applied to the terminal voltages of PWM inverter fed BLDCM is shown in FIG. 9. The waveform in channel 1 is the terminal voltage of phase A, channel 2 the filtered signal and channel 3 the output signal $S_a$.

It's found that the PWM chopping components superimposed upon the filtered signals are not attenuated small enough. Such an effect can hardly be diminished by the simple passive filters shown as FIG. 7 due to the relatively small frequency range between the chopping frequency (5 kHz) and the stator current frequency (15–210 Hz). Consequently there are still several zero crossings at the rising side of filtered signals, which introduce error to commutation instants decision.

On the other hand, due to phase-shifting effect, the falling edges of the rotor position sensor signals are always reliable. Based on this special feature, an asymmetric detecting method should be performed to achieve reliable commutation instants decision. Firstly, one of the falling edges of three rotor position sensor signals is detected, then after delaying for phase-shifting 90°−, the corresponding commutation in high side of inverter is taken place, and then an extra 60° delay, T60, is introduced to perform the corresponding low-side commutation. After the second commutation is finished, it's ready to detect a new falling edge in the next phase. Such logical relations can be shown as a table in FIG. 10.

In FIG. 10, corresponding to the event that falling edge in rotor position signal Sa of phase A being detected, the following two commutation events should be performed: Qb+ Qc+ in high side of inverter and Qa− Qb− in low side, where Qb+ Qc+ means Qb+ is to be turned off and Qc+ is to be turned on, while Qa− Qb− means Qa− is to be turned off and Qb− is to be turned on. Corresponding to the event that falling edge in rotor position signal $S_b$ of phase B is detected, the following two commutation events should be performed: Qc+ Qa+ in high side of inverter and Qb− Qc− in low side, where Qc+ Qa+ means Qc+ is to be turned off and Qa+ is to be turned on. Corresponding to the event that falling edge in rotor position signal $S_c$ of phase C is detected, the following two commutation events should be performed: Qa+ Qb+ in high side of inverter and Qc− Qa− in low side, where Qb− Qc− means Qb− is to be turned off and Qc− is to be turned on. Qa+ Qb+ means Qa+ is to be turned off and Qb+ is to be turned on. Qc− Qa− means Qc− is to be turned off and Qa− is to be turned on.

As to the detection on the falling edge of rotor position signals $S_a$, $S_b$ and $S_c$, it can be accomplished by distinguish the transition of state composition of the three position signals. The logical relations can be clearly illustrated in FIG. 11 along with FIG. 12.

Figure 11:
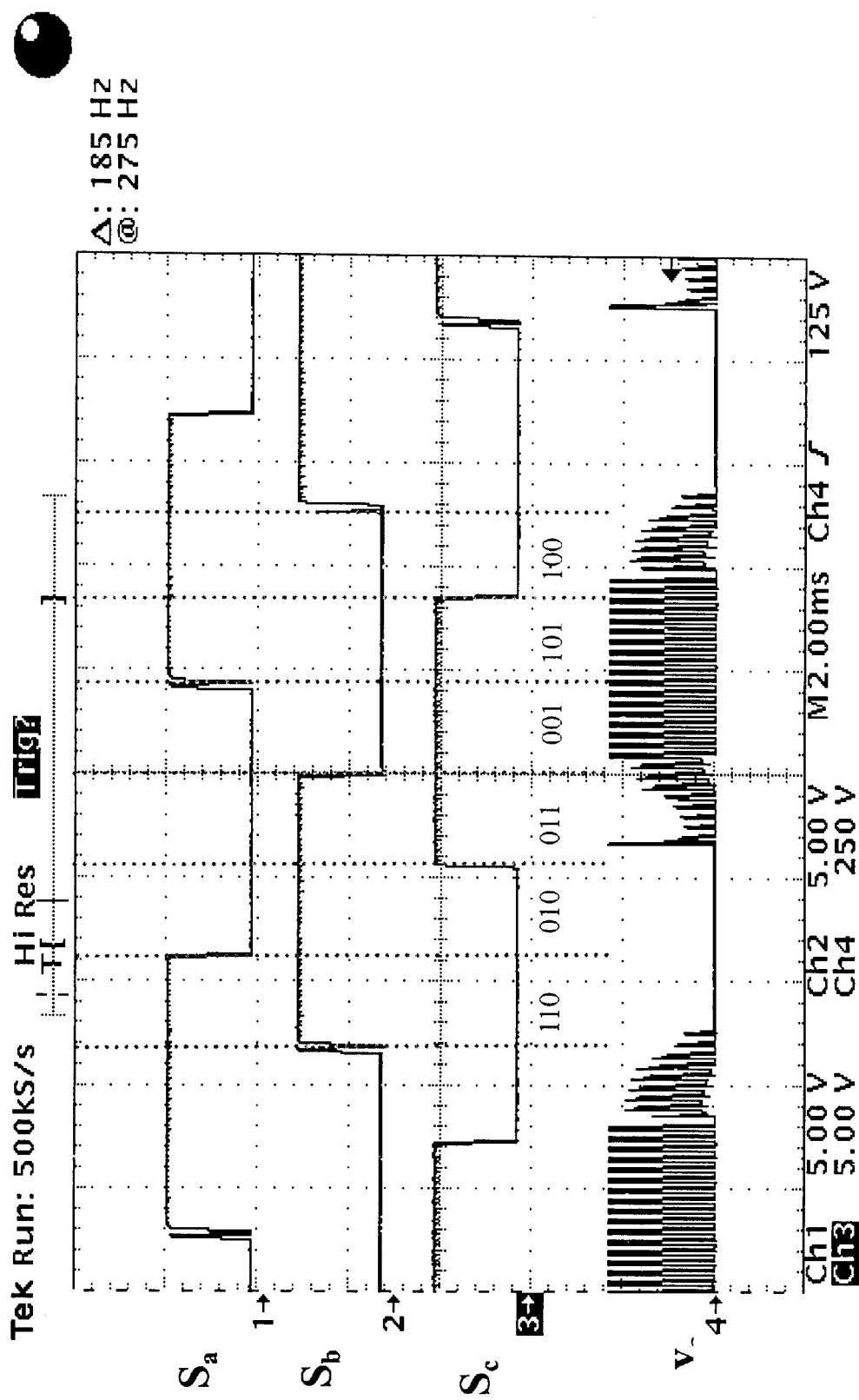
FIG. 11 shows waveforms indicating logical state relations of position signals.

In FIG. 11, the waveform in channel 1 is the rotor position signal $S_a$ of phase A output from aforementioned BEMF zero crossing detection circuit shown as FIG. 6, while channel 2 corresponding to $S_b$ of phase B and channel 3 corresponding to $S_c$ of phase C. The notations "110", "010", "011", "001", "101", and "100" indicate six various state compositions of the abovementioned rotor position signals. Wherein "1" represents high level state and "0" represents low level state. Consequently, "110" means that $S_a$ is in high level state, $S_b$ in high level state and $S_c$ in low level state respectively. "010" means that $S_a$ is in low level state, $S_b$ in high level state and $S_c$ in low level state respectively. "011" means that Sa is in low level state, $S_b$ in high level state and $S_c$ in high level state respectively. "001" means that $S_a$ is in low level state, $S_b$ in high low state and Sc in high level state respectively. "101" means that $S_a$ is in high level state, $S_b$ in low level state and Sc in high level state respectively. "100" means that $S_a$ is in high level state, $S_b$ in low level state and $S_c$ in low level state respectively.

It can be seen from FIG. 11 that at the instant as valid falling edge of $S_a$ occurs, the said state composition transfers from "110" to "010", while at the instant as invalid falling edge of Sa occurs, the said state composition transfers from "101" to "001". Therefore, the desired falling edge detection on rotor position signal $S_a$ of phase A can be performed correctly by simply recognizing the state composition transition event of "110" to "010". Consequently, the state composition transition from "110" to "010" is called a legal transition, whereas the one from "101" to "001" is called an illegal transition.

Similarly, the falling edge detection on rotor position signal $S_b$ of phase B can be performed by recognizing the legal state composition transition event of "011" to "001", and the falling edge detection on rotor position signal Sc of phase C can be performed by recognizing the legal state composition transition event of "101" to "100". Such logical relations can be shown as a table in FIG. 12, wherein the notation "100→010" means the said state composition transition from "110" to "010". "011→001" and "101→100" means similarity.

The detection of the falling edge in rotor position signals can be fulfilled with various methods. Two are provided below as the examples of the present invention.

(1) The detection of the falling edge in rotor position signals is fulfilled by distinguishing the transition of the state composition of the rotor position signals. And comprises the steps of: detecting the respective state compositions of the rotor position signals at a first time; determining if any of the state compositions matches with one of the state composition in a look-up table; saving the state composition at the first time as an initial state composition when being found to match with one of the state compositions in the look-up table; detecting the state compositions of the rotor position signals at a second time and saving the state composition at the second time as the present state composition; determining if the transition of the state composition from the initial state composition to the present state composition matches with one of the transitions of state compositions in the look-up table; and indicating a valid event of falling edge in rotor position signals when the transition of state composition matches with one of the transitions of state compositions in the look-up table.

(2) The detection of the falling edge in the rotor position signals is fulfilled by distinguishing an expected state composition of rotor position signals, and comprises the steps of: setting the phase number corresponding to a state composition of the rotor position signals at a first time; finding an expected state composition of the state composition corresponding to the phase number at the first time in a look-up table; detecting the state composition of the rotor position signal at the second time and saving the state composition at the second time as present state composition; comparing the present state composition to the expected state composition; and indicating an valid event of falling edge in rotor position signals when the present state composition matches with the expected state composition.

Figure 13:
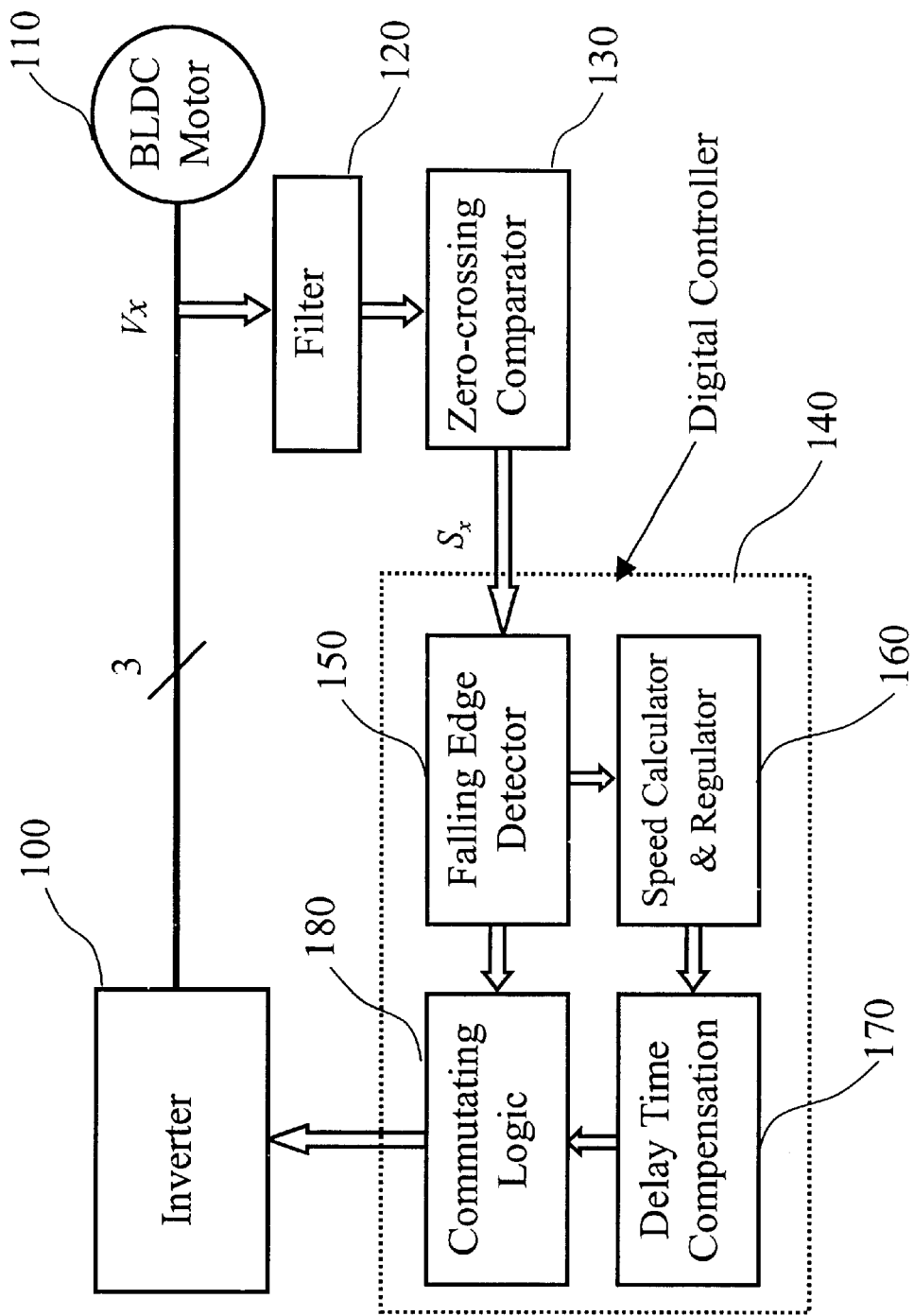
FIG. 13 shows constitution of the BLDC motor together with its controller.

Based on the rotor position detection circuit and the falling edge detection method mentioned above, a block diagram of a sensorless BLDC motor system according to a preferred embodiment of the present invention is illustrated in FIG. 13.

In the figure, reference notation 100 designates an inverter composed of power semiconductor devices, which commonly has a construction similar to a conventional inverter constituted by six full-controlled switches like IGBT, Power MOSFET, etc and six diodes connected in inverse parallel with the said switches. Notation 110 designates a BLDC motor which is composed of a three phase star connected armature winding and a permanent magnet rotor. Such a construction of a BLDC motor being fed by the said inverter is also illustrated in more detail in FIG. 1.

In FIG. 13, notation 120 together with notation 130 designates a rotor position detection means, which is composed of a filter section 120 and a zero-crossing comparator section 130. Such a rotorposition detection means is also illustrated in more detail in FIG. 6 together with FIG. 7 according to a preferred embodiment of the present invention. The rotor position detection means has three input signals $v_x$ ($v_a$, $v_b$, $v_c$) from three terminal voltages of the BLDC motor 110 and three output signals $S_x$ ($S_a$, $S_b$, $S_c$) named as rotor position signals.

In FIG. 13, notation 140 designates a digital controller as commutation signal generation means which performs a logical operation on rotor position signals $S_x$ to generate six commutation signals for the inverter 100. The digital controller 140 further comprises a falling edge detector means 150, a speed calculator and regulator means 160, a delay time calculation and compensation means 170 and a commutating logic means 180. In a preferred embodiment of the present invention, such a digital controller performs the commutation operation for the sensorless BLDC motor 110 according to the method illustrated in flowchart FIG. 14 and demonstrated in detail as following.

Figure 14:
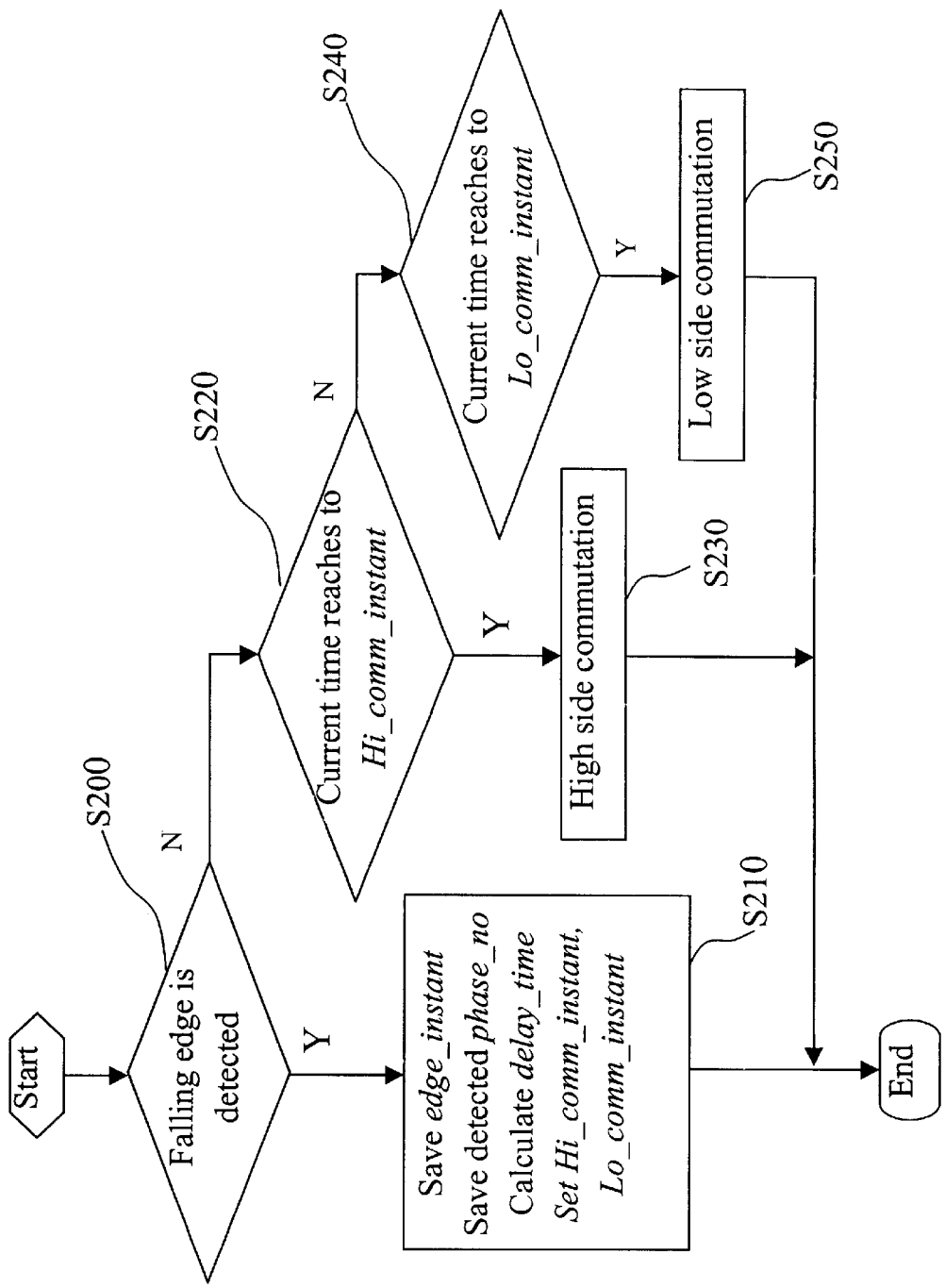
FIG. 14 shows flowchart of commutation program.

The control method can be arranged as a periodic interrupt service routine, which may be illustrated as a flowchart shown in FIG. 14 according to a preferred embodiment of the present invention. In the step S200, the current state composition of the three rotor position signals is detected, ci.e., whether a falling edge is detected or not). Such a detection action can be performed by sequentially reading the state composition of the three rotor position signals generated by the BEMF zero crossing detection circuit shown in FIG. 6, then matching the current state composition of the three rotor position signals with the proceeding once to form the transition events of the state composition of the three rotor position signals. Then, comparing the detected transition events of the state composition with those in the look-up table in FIG. 12. If one of the detected transition event matches with a corresponding event in the look-up table, a falling edge event is detected, and then the step S210 should be performed. In the step S210, in order to prepare for the two commutation events following the detected falling edge event, several arguments should be settled. Firstly, the argument edge_instant, indicating the instant of detected falling edge event, and phase_no, indicating the phase no of the detected falling edge, should be saved. Secondly, the phase shift compensation value should be calculated and set in the argument delay_time. Herein delay_time means time of phase-shifting 90°−, which can be derived by an interpolation subroutine. Consequently, the instants of the sequential two commutation events can be derived as follow. Hi_comm_instant, indicating the instant of corresponding high-side commutation event to be triggered, equals to edge_instant plus delay_time, while Lo_comm._instant, indicating the instant of corresponding low-side commutation event to be trigged, equals to Hi_comm._instant plus an extra 60° delay. The sequential commutation events can be reversed accordingly, to trigger the low-side communication event first.

It must be kept in mind that at step S210 (It is immediately after the falling edge event occurs), the real commutation events would not occur at once. Therefore, after the necessary commutation setup work is finished, the current interrupt service routine should be end and ready for the next detection routine occurring.

In the case that none falling edge events being detected in the step S200, the interrupt service routine is responsible for detecting whether it's time to trig commutation event. That is to say, it comes to the step S220 or step S240. In the step S220, the condition to perform a high-side commutation is checked by comparing the current time to that of the Hi_Comm._instant. When it is found that current time reaches the time of Hi_the comm._instant, the step S230 is performed to trigger the corresponding high-side commutation event. In the step S240, the condition to perform low-side commutation is checked by comparing the current time to that of the Lo_comm._instant. When it is found that current time reaches the time Lo_comm._instant, the step S250 is performed to trigger the corresponding low-side commutation event.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the claims.

What is claimed is:

1. A method for controlling a sensorless BLDC motor with a plurality of windings noted with a plurality of phase numbers and operated at PWM chopping mode to perform a series of sequential commutations, wherein the motor has an inverter with a plurality of high-side and low-side half bridge and a zero-crossing detection circuit, the method comprising the steps of:

detecting a falling edge in a plurality of rotor position signals generated from the BEMF zero crossing detection circuit;

recording the incident time and the corresponding phase number when a falling edge in the rotor position signals being detected, calculating all the delay values for the sequential commutations, and setting the time points for the sequential commutations for the high-side and low-side half bridge in the inverter respectively;

determining whether the time has reached the time point for the high-side commutation;

performing the high-side commutation to switch current on a pair of windings to a new pair of windings when the current time reaches the time point for the high-side commutation;

determining whether the current time has reached the time points for the low-side commutation; and performing the low-side commutation to switch current to a pair of windings to a new pair of windings when the current time reaches the time point for the low-side commutation.

2. The method of claim 1, wherein the BEMF zero crossing detection circuit comprises of a set of simple passive filters and a set of zero crossing comparators.

3. The method of claim 1, wherein the time point for the high-side commutation is set by adding the incident time the falling edge being detected with the delay value; and the time point for the low-side commutation is set by adding the delay value to the time point for the high-side communication.

4. The method in claim 1, wherein the delay value equals to an interval of 60 electrical angle.

5. The method of claim 1, wherein the step of detecting the falling edge in rotor position signals is fulfilled by distinguishing the transition of the state composition of the rotor position signals, the step further comprising the following steps of:

detecting the respective state compositions of the rotor position signals at a first time;

determining if any of the state compositions matches with one of the state composition in a look-up table;

saving the state composition at the first time as an initial state composition when being found to match with one of the state compositions in the look-up table;

detecting the state compositions of the rotor position signals at a second time and saving the state composition at the second time as the present state composition;

determining if the transition of the state composition from the initial state composition to the present state composition matches with one of the transitions of state compositions in the look-up table; and indicating a valid event of falling edge in rotor position signals when the transition of state composition matches with one of the transitions of state compositions in the look-up table.

6. The method of claim 1, wherein the step of detecting the falling edge in the rotor position signals is fulfilled by distinguishing an expected state composition of rotor position signals, the step further comprising the steps of:

setting the phase number corresponding to a state composition of the rotor position signals at a first time;

finding an expected state composition of the state composition corresponding to the phase number at the first time in a look-up table;

detecting the state composition of the rotor position signal at the second time and saving the state composition at the second time as present state composition;

comparing the present state composition to the expected state composition; and indicating an valid event of falling edge in rotor position signals when the present state composition matches with the expected state composition.

7. A method for controlling a sensorless BLDC motor with a plurality of windings noted with a plurality of phase numbers and operated at PWM chopping mode to perform a series of sequential commutations, wherein the motor has an inverter with a plurality of high-side and low-side half bridge and a zero-crossing detection circuit, the method comprising the steps of:

detecting a falling edge in a plurality of rotor position signals generated from the BEMF zero crossing detection circuit;

recording the incident time and the corresponding phase number when a falling edge in the rotor position signals being detected, calculating all the delay values for the sequential commutations, and setting the time points for the sequential commutations for the high-side and low-side half bridge in the inverter respectively;

determining whether the time has reached the time point for the low-side commutation;

performing the low-side commutation to switch current on a pair of windings to a new pair of windings when the current time reaches the time point for the low-side commutation;

determining whether the current time has reached the time points for the high-side commutation; and performing the high-side commutation to switch current to a pair of windings to a new pair of windings when the current time reaches the time point for the high-side commutation.

8. The method of claim 7, wherein the BEMF zero crossing detection circuit comprises of a set of simple passive filters and a set of zero crossing comparators.

9. The method of claim 7, wherein the time point for the low-side commutation is set by adding the incident time the falling edge being detected with the delay value; and the time point for the high-side commutation is set by adding the delay value to the time point for the low-side communication.

10. The method of claim 7, wherein the delay value equals to interval of 60 electrical angle.

11. The method of claim 7, wherein the step of detecting the falling edge in rotor position signals is fulfilled by distinguishing the transition of the state composition of the rotor position signals, the step further comprising the following steps of:

detecting the respective state compositions of the rotor position signals at a first time;

determining if any of the state compositions matches with one of the state composition in a look-up table;

saving the state composition at the first time as an initial state composition when being found to match with one of the state compositions in the look-up table;

detecting the state compositions of the rotor position signals at a second time and saving the state composition at the second time as the present state composition;

determining if the transition of the state composition from the initial state composition to the present state composition matches with one of the transitions of state compositions in the look-up table; and indicating a valid event of falling edge in rotor position signals when the transition of state composition matches with one of the transitions of state compositions in the look-up table.

12. The method of claim 7, wherein the step of detecting the falling edge in the rotor position signals is fulfilled by distinguishing an expected state composition of rotor position signals, the step further comprising the steps of:

setting the phase number corresponding to a state composition of the rotor position signals at a first time;

finding an expected state composition of the state composition corresponding to the phase number at the first time in a look-up table;

detecting the state composition of the rotor position signal at the second time and saving the state composition at the second time as present state composition;

comparing the present state composition to the expected state composition; and indicating an valid event of falling edge in rotor position signals when the present state composition matches with the expected state composition.

* * * * *